United States Patent [19]

Cleary et al.

[11] Patent Number: 4,740,779
[45] Date of Patent: Apr. 26, 1988

[54] AIRCRAFT PANORAMIC DISPLAY

[75] Inventors: Patrick J. Cleary, Federal Way; Arnold G. Gesell, Bellevue; Warren P. Stewart, Kent; Craig A. Hopperstad, Seattle, all of Wash.

[73] Assignee: The Boeing Company, Seattle, Wash.

[21] Appl. No.: 852,653

[22] Filed: Apr. 16, 1986

[51] Int. Cl.⁴ ............................................. G09G 1/16
[52] U.S. Cl. ................................... 340/705; 340/729; 340/732; 340/974; 358/104
[58] Field of Search ............... 340/705, 974, 975, 976, 340/977, 979, 980, 717, 729, 734, 720; 364/433, 434, 435, 428; 358/87, 104

[56] References Cited

U.S. PATENT DOCUMENTS

| | | | |
|---|---|---|---|
| 3,317,906 | 5/1967 | Baldridge | 340/366 |
| 3,514,871 | 6/1970 | Tucker | 35/12 |
| 3,668,622 | 6/1972 | Gannett et al. | 340/729 |
| 3,699,511 | 10/1972 | Fletcher et al. | |
| 3,719,817 | 3/1973 | McCoy et al. | 340/732 |
| 3,757,040 | 9/1973 | Bennett et al. | 340/720 |
| 3,880,509 | 4/1975 | Herndon | 353/12 |
| 3,895,861 | 7/1975 | Herndon | 352/69 |
| 3,911,597 | 10/1975 | Millard et al. | 358/104 |
| 4,147,056 | 4/1979 | Muller | 73/178 |
| 4,149,148 | 4/1979 | Miller et al. | 340/721 |
| 4,247,843 | 1/1981 | Miller et al. | |
| 4,263,726 | 4/1981 | Bolton | 358/104 |
| 4,305,057 | 12/1981 | Rolston | |
| 4,315,240 | 2/1982 | Spooner | |
| 4,368,517 | 1/1983 | Lovering | 340/729 |
| 4,463,355 | 7/1984 | Schultz et al. | 340/971 |
| 4,484,189 | 11/1984 | Dettmer | 340/974 |
| 4,513,509 | 4/1985 | Nordstrom | 340/974 |

OTHER PUBLICATIONS

D. Rees, M. Lisic, Industrial Photography, "Panoramic Optics Give U.S. Tankers a Better Than Birdseye View", Apr. 1963, pp. 36, 37 and 69.

Primary Examiner—Gerald L. Brigance
Attorney, Agent, or Firm—Christensen, O'Connor, Johnson & Kindness

[57] ABSTRACT

A panoramic display system for an aircraft comprising a display screen and line generation means for generating a line image on the display screen. The position of the line image on the display screen corresponds to the position of a projection of an artifact external to the aircraft onto an imaginary window to an eye point within the aircraft. The eye point is positioned on the opposite side of the window from the artifact. The line image may be generated by determining the position of a great circle on a sphere having its center at the eye point, such that the position of the great circle corresponds to the artifact projected onto the sphere to the eye point. The position of the line image on the display screen corresponds to the position of the great circle on the sphere. The display system may comprise a plurality of display screens positioned adjacent to one another such that each can be viewed from a single viewing point. Partial line images are generated on each display screen such that the position of each partial line image corresponds to the position of the projection of the artifact onto a window portion to the eye point. The eye point is common to all window portions, and the spatial relationship of the window portions with respect to one another is congruent with the spatial relationship of the display screens with respect to one another.

24 Claims, 9 Drawing Sheets

AIRCRAFT PANORAMIC DISPLAY

FIELD OF THE INVENTION

The present invention relates to systems for displaying information to an aircraft crew.

BACKGROUND OF THE INVENTION

In modern aircraft, sensors provide comprehensive information concerning the status of the aircraft, and such information is displayed to the crew via a large number of individual electromechanical displays. Each such display typically comprises means for indicating a series of decimal digits representing a parameter such as altitude, and/or an analog type display in which the parameter is indicated by the position of a pointer on a circular dial. In general, there are two types of problems associated with conventional electromechanical displays. The first problem relates to the fact that such displays are proliferating in the cockpits of modern jet aircraft, resulting in high costs for engineering, manufacturing, training, company documentation and operator logistics. As flight control systems become more complex, display formats and arrangements are growing proportionately in complexity, thereby complicating wiring, cooling, crew operational procedures, and customer maintenance.

A second problem with conventional electromechanical displays is that such displays, as presently formatted, require the crew to read the displays one at a time using foveal rather than peripheral vision. Foveal vision is vision using the small central area of the retina that has the highest visual acuity. The need to scan a large and increasing number of electromechanical displays using foveal vision requires the crew to apply integrative processing from the individual displays and mentally construct the present aircraft configuration or flight status. The consequence of this limitation of conventional electromechanical displays is apparent in the large difference in performance between a human operator under Visual Flight Rules (VFR) conditions with real world cues, and one under Instrument Flight Rules (IFR) conditions with only instrument information from electromechanical displays. In good VFR conditions, the average pilot is capable of landing an aircraft with a high degree of accuracy, and with relatively little effort. Under IFR conditions, with only instruments as a guide, landing can be a difficult task. Crop dusters and acrobatic flying teams do not fly on instruments.

SUMMARY OF THE INVENTION

The human eye and the visual cortex of the brain are capable of processing a large amount of information when the total visual field of the eye is used as a receptor. In the analytical treatment of motion, orientation, and position, useful artifice is the resolution of these parameters into orthogonal components, such that each component can be treated separately. This thinking has carried over into current flight deck displays, so that the individual components are displayed separately by displays that can only be read using foveal vision. The human operator must therefore create a mental image of the spatial position, orientation and motion by scanning all the relevant instruments. This process requires considerable skill and training, and does not invoke the full capability of the visual cortex. In addition, the possibility of missing important parameters is comparatively high. The difficulty is that a human operator does not solve real problems of position and motion either easily or rapidly by breaking such features down into orthogonal components.

The average automobile driver may drive home from work each day, navigating by recognition of patterns of the surrounding real world. Using full visual capabilities, the driver interprets the relative motion of other vehicles, and adjusts vehicle speed and position accordingly to avoid conflict with little effort. The driver arrives home with little recollection of how such tasks were accomplished, so simple (subjectively) is this series of complex tasks. This analysis leads to the conclusion that the reason for the difficulty of IFR flying is due to the complexity and lack of information supplied by conventional electromechanical displays, which do not translate in a form easily perceptible by a human operator.

The present invention provides a display system that takes advantage of the increased information processing ability of a human operator's eye when the total visual field of the eye is used as a receptor. The display system is adapted for use in an aircraft in which suitable signals are provided representing the orientation of the aircraft. The display system comprises a display screen and line generation means for generating a line image on the display screen. The position of the line image on the display screen corresponds to the position of a projection of an artifact external to the aircraft onto and through an imaginary window to an eye point within the aircraft. The eye point is positioned on the opposite side of the window from the artifact, along a line normal to a portion of the window. The line generation means preferably includes means for determining the position of a great circle on a sphere having its center at the eye point, such that the position of the great circle on the sphere corresponds to the artifact projected onto the sphere to the eye point, and means for generating the line image such that the position of the line image on the display screen corresponds to the position of the great circle on the sphere. The window is preferably a segment of the surface of a cylinder having an axis oriented vertically with respect to the aircraft, and the line generation means includes means for projecting the great circle from the sphere onto the cylinder in a direction away from the eye point. The great circle is preferably determined by determining the position of an intersection point between the great circle and an equator on the sphere, as well as a spherical angle between the great circle and the equator at the intersection point.

In a further aspect, the present invention provides a plurality of display screens positioned approximately adjacent to one another, such that all display screens can be viewed from a single viewing point, providing a panoramic effect. The line generation means includes means for generating a partial line image on each display screen, such that the position of each partial line image on its associated display screen corresponds to the position of the projection of the artifact onto a window portion to the eye point, the eye point being common to all window portions. The spatial relationship of the window portions with respect to one another is congruent with the spatial relationship of the display screens with respect to one another. The display screens are positioned such that a line normal to a portion of each display screen passes approximately through the eye point. The line generation means preferably comprises a master processor, a plurality of display processors, and communication means for transmitting data from the master processor to the display processors. One display processor is associated with each display screen. The master processor is operative to periodically determine the position of the intersection point between the great circle and the equator, as well as the spherical angle between the equator and great circle at the intersection point. Data representing the intersection point and spherical angle is sent to each display processor. Each display processor periodically generates the corresponding partial line image corresponding to the range of positions associated with that display screen.

In one embodiment, the artifact comprises a straight line representing an artificial horizon forward of the aircraft. In another aspect, the artifact comprises a pair of straight lines corresponding to the lateral edges of a strip extending at constant altitude from the position of the aircraft away from the aircraft in a direction parallel to the aircraft's motion. The altitude of the strip can take on any one of a plurality of discrete values. The strip can represent a ceiling above the aircraft, in which case the strip altitude is the smallest of such discrete values greater than the current aircraft altitude. The strip may also represent a floor below the aircraft, in which case the strip altitude is the greatest of the discrete values smaller than the aircraft altitude. The display system is preferably adapted to display lines corresponding to the artificial horizon, the ceiling and the floor.

DETAILED DESCRIPTION OF THE INVENTION

Figure 1:
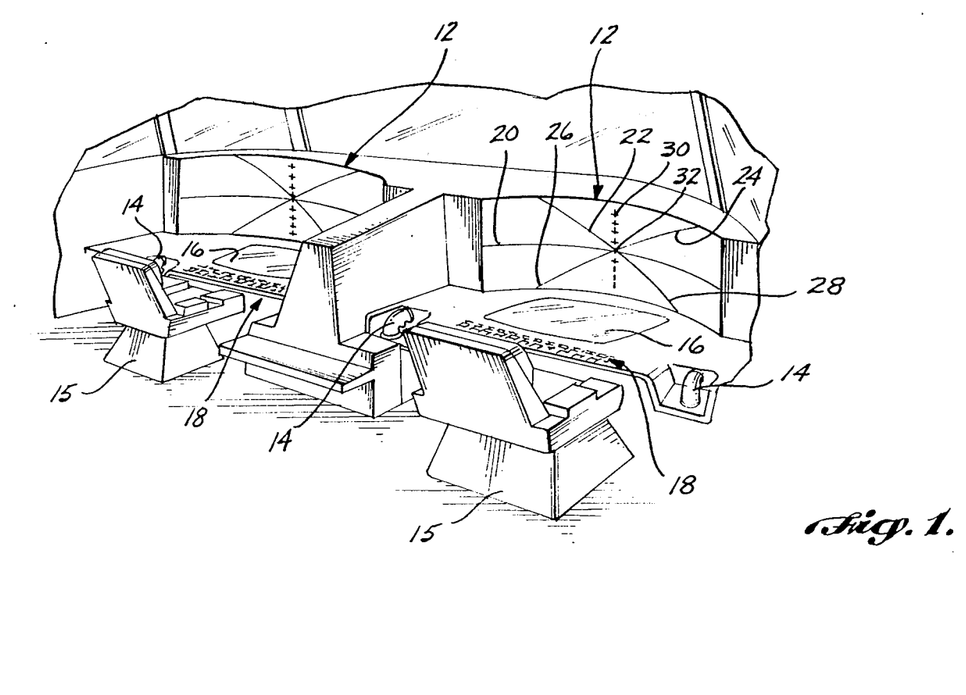
FIG. 1 is a conceptional view of the cockpit of an aircraft using the display system of the present invention.

The concepts and principles of the present invention are illustrated by way of example by the panoramic display system shown in FIG. 1. The panoramic display system is implemented in the cockpit of a commercial jet aircraft for a two person crew, and comprises essentially identical left- and right-hand installations. Alternately, panoramic display systems can be implemented either as a single display system or into systems of two or more displays to suit cockpit arrangements either for a one person crew, two person crew or more than two person crew. In FIG. 1, each installation comprises panoramic display 12, joysticks 14, seat 15, conventional display screen 16, and keyboard 18. Joysticks 14, display screen 16 and keyboard 18 may operate in a manner similar to the corresponding elements in a conventional flight management control system.

Panoramic display 12 is adapted to replace a large number of conventional electromechanical displays, by providing the information previously provided by such displays in a more natural real world format. In the display system shown in FIG. 1, panoramic display 12 is wrapped around in the horizontal direction to produce a panoramic effect. The radius of curvature and position of the panoramic display are preferably established such that the center of curvature of the display approximately coincides with the pilot's eyes. Because cost effective curved displays of the type illustrated in FIG. 1 are not presently available, the best mode of practicing the present invention with presently available technology is to construct panoramic display 12 by a plurality of side-by-side flat panel displays. The several flat panel displays are angled with respect to one another to produce a combined display area that is curved as generally indicated in FIG. 1. A plurality of CRT displays could also be used. However, CRTs are both heavy and bulky, and therefore not preferred for the present invention. Although any kind of flat panel display could be used, electroluminescent displays are preferred, given current technology, because of their comparatively high brightness.

Figure 2:
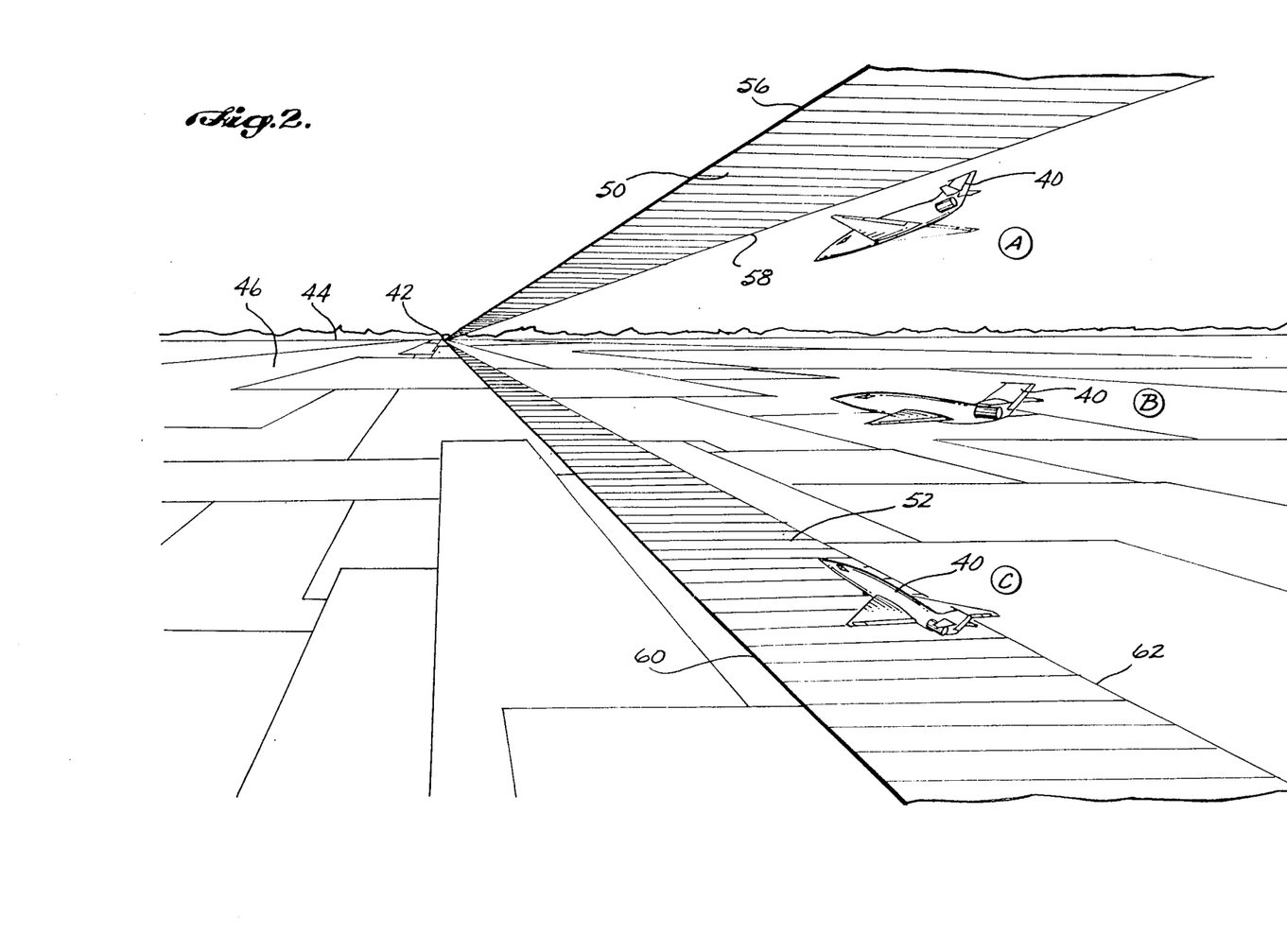
FIG. 2 is a schematic, perspective view showing the artificial horizon, ceilings and floors with respect to aircraft position.

The basic components of the display provided on panoramic display 12 are an artificial horizon defined by horizon line 20, a ceiling defined by ceiling lines 22 and 24, a floor defined by floor lines 26 and 28, and pitch scale 30. The horizon, ceiling and floor lines meet at intersection point 32. The artificial horizon, the ceiling and the floor are artifacts external to the aircraft. The ceiling and floor could also be expressed as imaginary highways, pathways or roadways in the sky. FIG. 2 shows aircraft 40 in level flight, flying towards point 42 on artificial horizon 44. Artificial horizon 44 is defined as a horizontal straight line at an infinite distance at the elevation of the aircraft. The aircraft is shown in three positions in FIG. 2, for reasons described below. The position of point 42 on artificial horizon 44 is defined by the horizontal component of the velocity vector of aircraft 40. In the example of FIG. 2, the horizontal component of the velocity vector is assumed to coincide with the aircraft's longitudinal axis, i.e., there are no crosswinds.

Ceiling 50 and floor 52 are constant altitude planar strips that are aligned parallel to the horizontal component of the velocity vector of aircraft 40, that are centered laterally with respect to the aircraft's horizontal position, and that are a fixed distance apart in altitude. In a preferred embodiment, this fixed distance is 1,000 feet, the altitude of ceiling 50 is the smallest number evenly divisible by 1,000 that is greater than the aircraft's current altitude, and the altitude of floor 52 is the largest number evenly divisible by 1,000 that is smaller than the aircraft's current altitude.

Panoramic display 12 may be thought of as a window fixed in the nose of the aircraft. The position of horizon line 20 on panoramic display 12 corresponds to the position of the projection of artificial horizon 44 onto and through such an imaginary window to an eye point within the aircraft. The eye point is positioned such that it approximately corresponds to the position of the eyes of a pilot sitting in seat 15. Stated somewhat differently, if artificial horizon 44 were viewed from the eye point through the imaginary window, the apparent position of the artificial horizon in the window would be the same as the position of horizon line 20 on panoramic display 12. In an identical manner, the positions of ceiling lines 22 and 24 on panoramic display 12 correspond to the projections of the lateral edges 56 and 58 of ceiling 50 onto and through the imaginary window to the eye point, and the positions of floor lines 26 and 28 on panoramic display 12 correspond to the projections of lateral edges 60 and 62 of floor 52 onto and through the imaginary window to the eye point. Both the imaginary window and the eye point are assumed to be fixed in the aircraft. The absolute orientation of the window therefore changes as the aircraft rolls, pitches and yaws. The height and width of the window corresponds to the height and width of panoramic display 12.

Figure 3A:
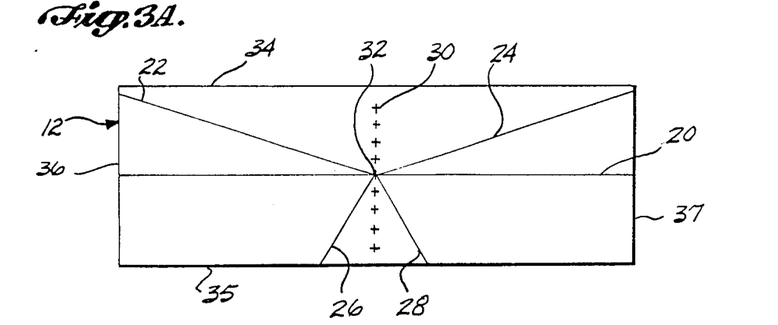
FIGS. 3A-3C illustrate the horizon, ceiling and floor lines for various aircraft altitudes.
Figure 3B:
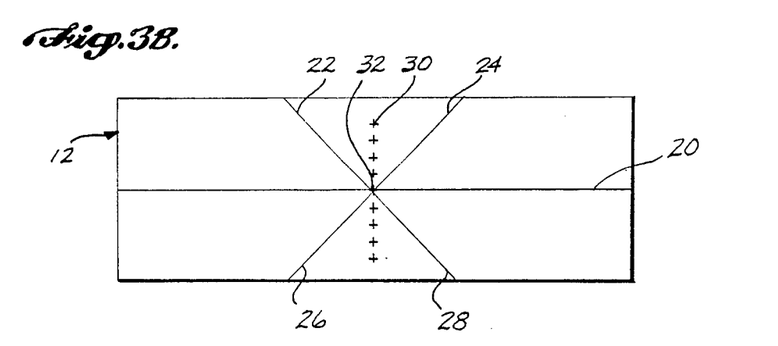
Figure 3C:
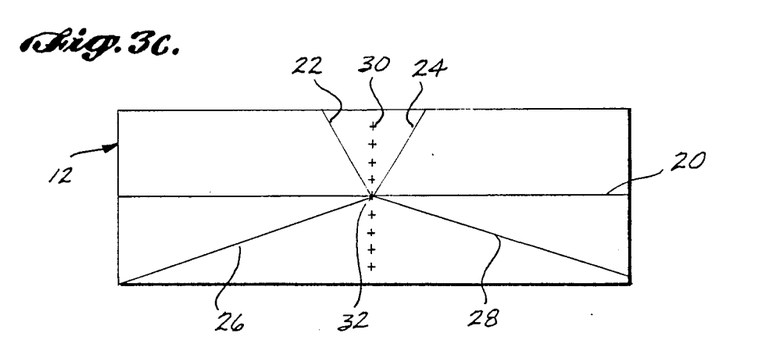

In FIG. 2, aircraft 40 is shown in three positions (A, B and C) that are directly above and below one another, for example at elevations of 1,850, 1,500 and 1,150 feet. FIGS. 3A–3C illustrate the appearance of the horizon, ceiling and floor lines on panoramic display 12 for aircraft positions A, B and C, respectively. At all of these positions, horizon line 20 comprises a horizontal line that bisects panoramic display 12. The horizon line does not change between FIGS. 3A, 3B and 3C, because the artificial horizon is at an infinite distance and at the same altitude as the aircraft. The appearance of horizon line 20 when aircraft 40 is pitching, rolling, or yawing is described below. Because the altitude of aircraft 40 in FIG. 2 ranges from 1,150–1,850 feet, the elevations of ceiling 50 and floor 52 are 2,000 feet and 1,000 feet, respectively, for all the three positions (A, B, and C). It is assumed that terrain 46 is at some elevation between 0 and 1,000 feet. FIG. 3B represents the floor and ceiling at aircraft position B in level flight at an elevation of 1,500 feet. Ceiling 50 is displayed via ceiling lines 22 and 24, the ceiling lines corresponding to the lateral edges 56 and 58, respectively, of ceiling 50. Similarly, floor 52 is defined by floor lines 26 and 28 that correspond to the lateral edges 60 and 62 of floor 52. Because at position B the aircraft is vertically positioned halfway between floor 52 and ceiling 50, the ceiling and floor lines in FIG. 3B are symmetric with respect to horizon line 20. The horizon ceiling and floor lines always meet at intersection point 32. Because aircraft 40 is in level flight (i.e., no roll, pitch, or yaw) in FIGS. 2 and 3B, the intersection point lies at the geometric center of panoramic display 12 in FIGS. 3A–3C.

At position A, the aircraft is flying at an elevation of 1,850 feet, and is much closer to ceiling 50 than to floor 52. The corresponding display is illustrated in FIG. 3A.

As shown, ceiling lines 22 and 24 have diverged with respect to their positions in FIG. 3B, and floor lines 26 and 28 have converged with respect to their positions in FIG 3B. The result is a perspective effect that corresponds to the way that the ceilings and floors would appear were they actual objects in the sky rather than artifacts. The crew therefore obtains an intuitive feel for both the position of the plane with respect to the nearest 1,000 foot altitude levels. Furthermore, the rate at which the panoramic display changes between FIGS. 3B and 3A as the aircraft climbs provides a cue as to the rate of climb. If the aircraft were to continue climbing through ceiling 50, ceiling lines 22 and 24 would continue to diverge until they passed through horizon line 20 and become floor lines. At that instant, floor lines 26 and 28 would converge and vanish, and reappear in the top half of the panoramic display as new ceiling lines corresponding to a ceiling at 3,000 feet.

FIG. 3C illustrates the panoramic display corresponding to aircraft position C, the display of FIG. 3C being essentially the reverse of the display in FIG. 3A. At position C, aircraft 40 is much closer to floor 52 than to ceiling 50. Ceiling lines 22 and 24 have therefore converged with respect to their positions in FIG. 3B, and floor lines 26 and 28 have diverged with respect to their positions in FIG. 3B. The panoramic display of FIG. 3C is essentially the mirror image of the diaplay of FIG. 3A. This symmetry flows from the fact that in position A, the aircraft is 150 feet below ceiling 50, while in position C, the aircraft is 150 feet above floor 52.

If panoramic display 12 is implemented by means of displays that permit the use of intermediate (i.e., gray scale) shades, as opposed to simply black and white or illuminated and non-illuminated, then it may be desirable for some applications to provide shading to create the image that the floors and ceiling are solid objects rather than simply pairs of lines. In one suitable scheme, the area between ceiling lines 22 and 24 and the area between the horizon line and the floor lines could both be shaded gray, while the remaining areas of panoramic display 12 could remain unshaded. Other shading techniques could also be used.

Figure 4A:
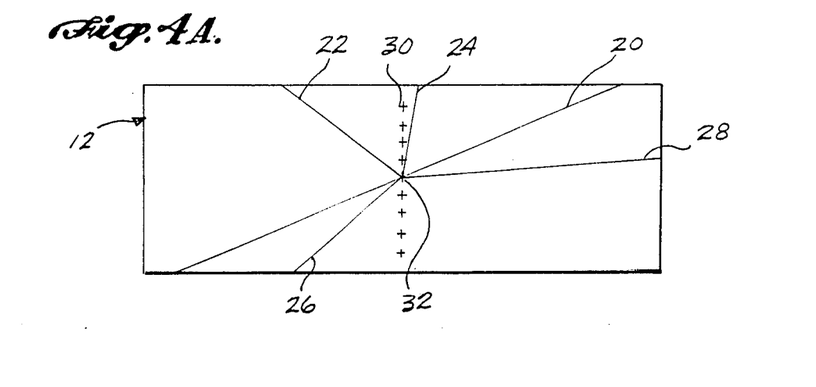
FIGS 4A-4C illustrate the horizon, ceiling and floor lines for different aircraft orientations.
Figure 4B:
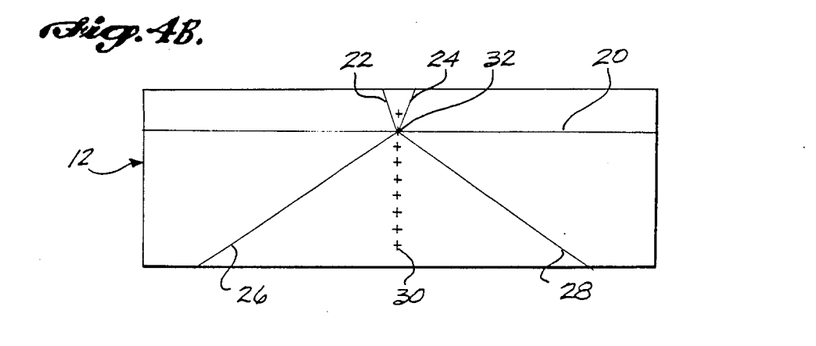
Figure 4C:
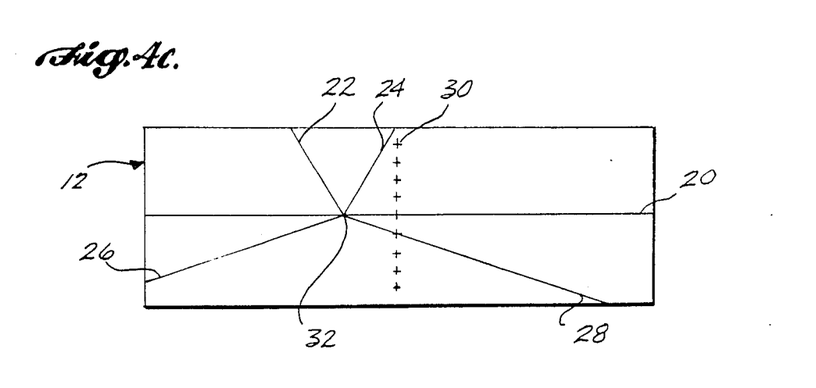

The appearance of panoramic display 12 during roll, pitch and yaw maneuvers at aircraft position B is illustrated by FIGS. 4A, 4B and 4C, respectively. As illustrated in FIG. 4A, when aircraft 40 rolls, but otherwise remains in straight ahead, level flight, the entire panoramic display rotates around point 32. The direction of rotation of the display is opposite to the direction of roll of the aircraft, to simulate the appearance of the artificial horizon, ceiling and floor as they would appear through the imaginary window during an actual roll maneuver. The techniques by which the horizon, ceiling and floor lines are determined for actual roll maneuver are described in detail below. It is to be noted in FIG. 4A that because the aircraft has neither pitched nor yawed, intersection point 32 has not moved with respect to its position in FIGS. 3A–3C. If the aircraft pitched downward and yawed during a left roll maneuver, horizon line 20 declines from the left display quadrant to the right and intersection point 32 would appear to the left and below the midpoint of the pitch scale. A roll right orientation would produce a mirror image of the display.

FIG. 4B shows panoramic display 12 as it would appear when aircraft 40 was in a nose down pitch attitude without roll or yaw. As illustrated, the entire display, including intersection point 32, has moved upward along pitch scale 30, such that the position of the intersection point along the pitch scale indicates the degree of pitch. The pitch scale preferably includes marks and numerical symbols to indicate the pitch angle. A nose-up orientation would produce the opposite display, with intersection point 32 below the midpoint of the pitch scale. Finally, FIG. 4C illustrates the effect of aircraft yaw, assuming no roll or pitch. As indicated, yaw causes the entire display, including intersection point 32, to move laterally across the panoramic display. Yaw produces such a display because the borders of the panoramic display (i.e., the imaginary window) are assumed fixed in the aircraft, while the lateral position of intersection point 32 is defined by the horizontal component of the velocity vector of the aircraft.

Additional flight information can be graphically portrayed such as airspeed which can be presented by a series of moving speed values with complete geometric fidelity, weather radar, collision avoidance, air traffic control, compass scales for course and heading, VOR stations, way point indicators and altitude readouts.

Figure 5:
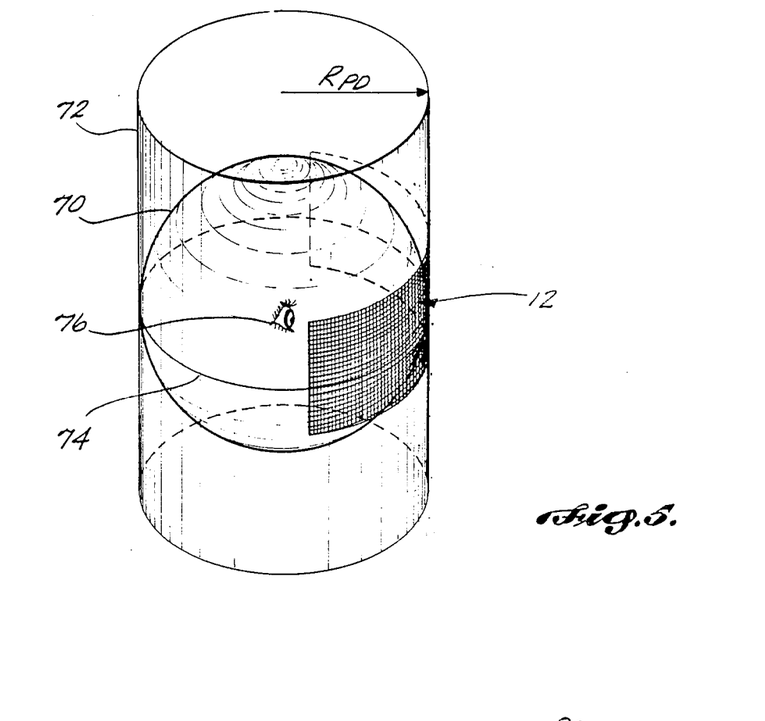
FIG. 5 is a schematic, perspective view showing the eye point, the sphere and the cylinder.

The technique for the production of the horizon line and the floor and ceiling lines on panoramic display 12 are outlined in FIGS. 5-15. FIG. 5 shows sphere 70 enclosed within cylinder 72 such that the sphere is tangent to the cylinder along equator 74. Equator 74 defines a plane that passes through eye point 76 and that is horizontal with respect to the aircraft. Panoramic display 12 is positioned on cylinder 72 and is centered in the vertical direction about equator 74. Eye point 76 is at the center of the sphere. To simplify the illustration, it will be assumed that panoramic display 12 extends halfway around cylinder 72, although panoramic displays having a smaller (or greater) angular extent may also be employed. It is evident from FIG. 5 that the radius of the panoramic display ($R_{PD}$) is equal to the radius of the cylinder and of the sphere, and that the distance from eye point 76 to panoramic display 12 is also $R_{PD}$.

Figure 6:
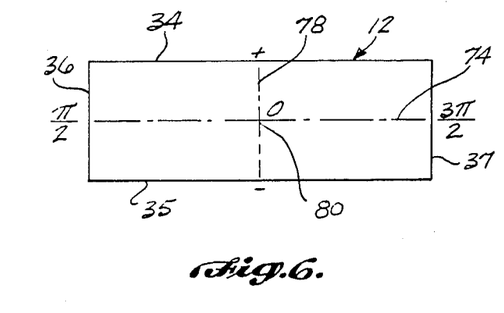
FIG. 6 illustrates the angle conventions for the display screen and window.
Figure 7:
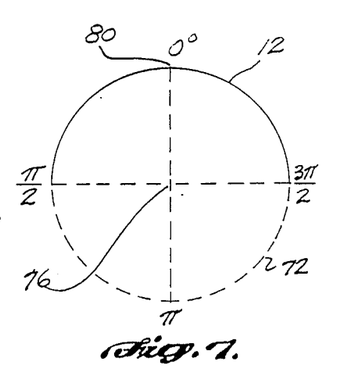
FIG. 7 further illustrates the angle conventions for the display screen and window.

A coordinate system for panoramic display 12 is illustrated in FIGS. 6 and 7. The panoramic display 12 includes upper and lower borders 34 and 35, respectively, and left and right borders 36 and 37, respectively. Equator 74 is parallel to and spaced halfway between the upper and lower borders. Prime meridian 78 is perpendicular to equator 74, and positioned halfway between the left and right borders. The prime meridian intersects the equator at center point 80 that corresponds to the straight ahead direction, i.e., to the forwardly directed longitudinal axis of the aircraft. Distances along the equator and prime meridian are measured in degrees of "longitude" and "latitude" respectively with respect to center point 80. Since it has been assumed that panoramic display 12 extends halfway around cylinder 72, the longitudinal extent of the equator is 180°. As illustrated in FIG. 6, a convention is adopted in which the longitude and latitude at center point 80 are both taken to be zero degrees, the longitude of the left-hand edge of the panoramic display is taken as 90°, and the longitude at the right-hand edge of the panoramic display is taken as 270°. The latitude coordinate along prime meridian 78 is assumed to be positive above equator 74 and negative below equator 74.

Figure 8:
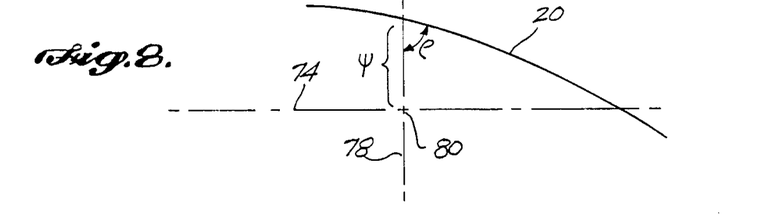
FIG. 8 is a graph showing certain of the parameters used to define the great circle.

The display technique of the present invention is based upon the principle that when the artifact consists of a straight line, or has the appearance of a straight line when viewed from the aircraft, the projection of the artifact onto sphere 70 to eye point 76 will comprise an arc of a great circle on the sphere. Assume for example that the aircraft (together with panoramic screen 12, equator 74, and prime meridian 78) is pitched down and rolled to the left. The appearance of horizon line 20 under such conditions is schematically illustrated in FIG. 8. The roll, yaw and pitch of the aircraft will be designated by the symbols R, Y and P, respectively, with roll positive to the right (i.e., clockwise), yaw positive to the right, and pitch positive upward. At prime meridian 78 where the longitude equals zero, the artificial horizon 20 will be displaced upward by an angle $\psi$ that is equal to $-P$. The roll of horizon line 20 is described by the spherical angle $\rho$ between prime meridian 78 and the horizon line. Inspection of FIG. 8 reveals that:

$$\rho = \frac{\pi}{2} + R \tag{1}$$

Figure 9:
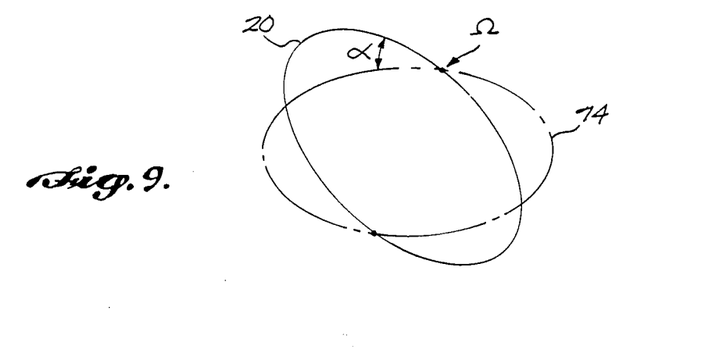
FIG. 9 shows the relationship between the great circle and the equator.
Figures 10, 11:
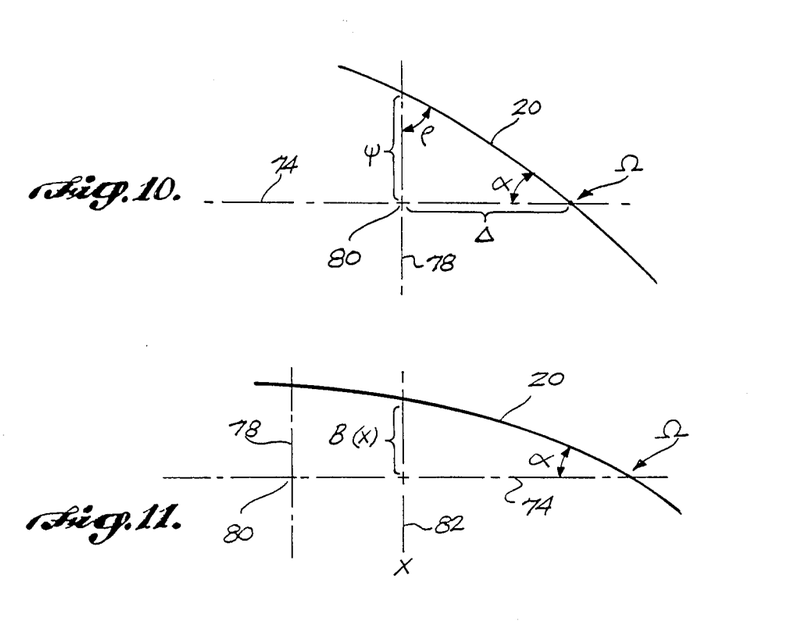
FIG. 10 illustrates the angular relationships of the great circle with respect to the equator and prime meridian.
FIG. 11 illustrates the determination of the distance between the great circle and equator for different longitude positions.

The parameters $\psi$ and $\rho$ can be transformed into more useful parameters as illustrated in FIGS. 9 and 10. FIG. 9 illustrates the relationship between horizon line 20 and equator 74 on sphere 70. The angle $\Omega$ is defined as the longitude of the point where the horizon line intersects the equator and is above the equator in a counterclockwise direction. The angle $\alpha$ is defined as the spherical angle formed by the horizon line and equator at such point of intersection. By schematically combining FIGS. 8 and 9 in FIG. 10, and by using standard spherical trigonometry identities, one can write:

$$\alpha = \arccos(\sin \rho \cdot \cos \psi) \tag{2}$$

$$\Delta = \arcsin\left(\frac{\tan \psi}{\tan \alpha}\right) \tag{3}$$

$$\Omega = -\Delta \text{ for roll to the left} \tag{4}$$

$$\Omega = \Delta - \pi \text{ for roll to the right} \tag{5}$$

where $\Delta$ is defined as indicated in FIG. 10. Equations (2) and (3) hold for all aircraft orientations. Equations (4) and (5) for $\Omega$ are used alternately, depending on whether the roll is to the left or to the right, respectively.

Referring now to FIG. 11, for a meridian 82 other than prime meridian 78, let x be the longitude of meridian 82, and B(x) be the angular separation between horizon line 20 and equator 74 along meridian 82. Standard spherical trigonometric identities may be used to compute B(x) as follows:

$$B(x) = \arctan(\sin(x-\Omega) \cdot \tan \alpha) \tag{6}$$

B(x) must be a maximum for a meridian at position x' at which $x' - \Omega = \pi/2$. Substitution of this condition in Equation (6) yields:

$$B(x') = \arctan(\sin(\pi/2) \cdot \tan \alpha) = \alpha \tag{7}$$

Thus, the maximum separation between horizon line 20 and equator 74, in degrees, is equal to the angle $\alpha$ between the horizon line and the equator.

Figure 12:
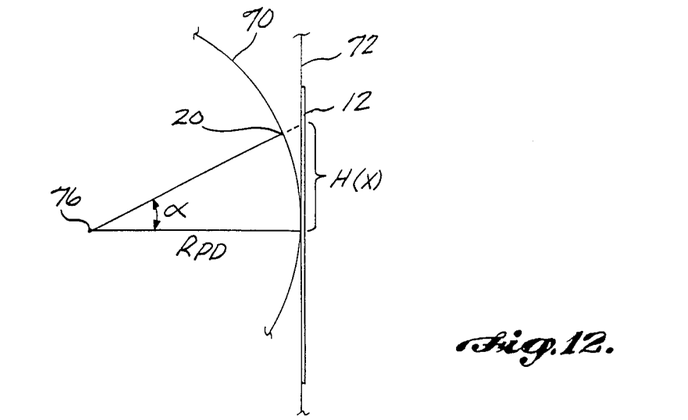
FIG. 12 shows the projection of the great circle from the sphere to the cylinder.

The equations derived above are valid for sphere 70, and may be transferred from sphere 70 to cylinder 72 as indicated in FIG. 12. FIG. 12 illustrates a vertical cross section that passes through eye point 76 (FIG. 5) and that intersects panoramic display 12 at longitude x'. If the function H(x) is defined as the vertical distance between the horizon line and the equator as projected onto cylinder 72 and panoramic display 12, then one may write:

$$H(x')=H(\alpha)=R_{PD} \tan \alpha \tag{8}$$

where $R_{PD}$ is the radius of the panoramic display, as well as of sphere 70 and cylinder 72. Combining Equations (6) and (8), one may then write:

$$H(x)=H(B(x))=\sin(x-\Omega)\cdot H(\alpha) \tag{9}$$

to determine H(x) for all other meridians. Thus, to generate horizon line 20 on panoramic display 12 for a set of longitude points $x_1, x_2, \ldots x_N$, it is only necessary to determine $H(\alpha)$ using Equations (1), (2) and (8), determine using Equation (3), (4) and (5), and then compute the latitude coordinate for each point $x_i$ as follows:

$$H(x_i)=\sin(x_i-\Omega)\cdot H(\alpha) \tag{10}$$

The precision with which horizon line 40 is calculated is thus determined by the spacing of the $x_i$ points along equator 74.

Figure 13:
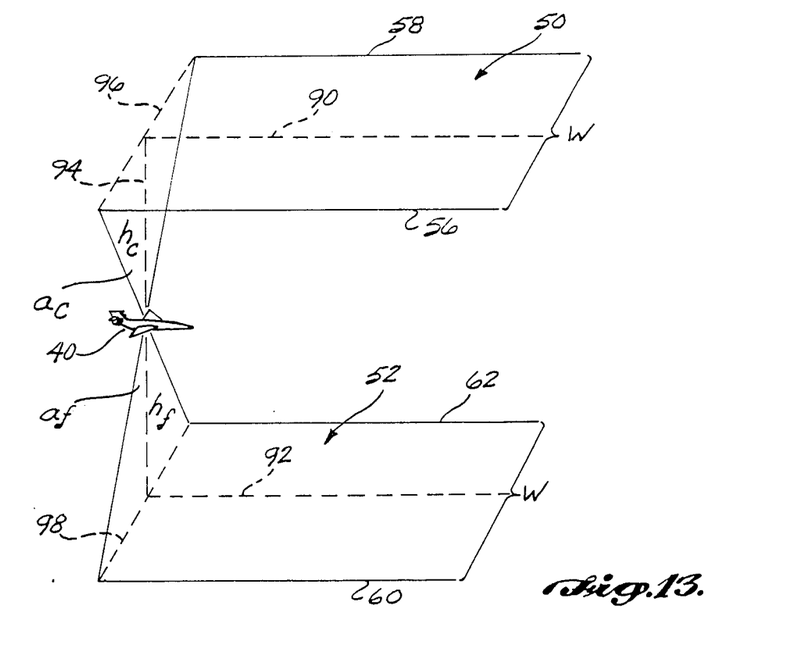
FIG. 13 shows the ceilings and floors with respect to the aircraft.

The calculation of ceiling lines 22 and 24 and floor lines 26 and 28 employs a technique generally similar to that used to calculate horizon line 20. FIG. 13 illustrates aircraft 40 flying between ceiling 50 and floor 52. As in FIG. 2, the edges of ceiling 50 are defined by lines 56 and 58 and the edges of floor 52 are defined by lines 60 and 62. Lines 90 and 92 represent the centerlines of ceiling 50 and floor 52 respectively. Line 96 extends laterally across ceiling 50 at the present aircraft position, and line 98 extends laterally across floor 52 at the present aircraft position. Lines 90, 92, 96, and 98 do not appear in panoramic display 12, but are included in FIG. 13 for purposes of illustration. The height of ceiling 50 above aircraft 40 is $h_c$, and the height of aircraft 40 above floor 52 is $h_f$, $h_c$ and $h_f$ being measured along vertical line 94 that passes through the position of aircraft 40 and that connects the intersection of lines 90 and 96 with the intersection of lines 92 and 98. If the ceiling and floor are taken to have identical widths W, then the angles $a_c$ and $a_f$ in FIG. 13 are given by:

$$a_f = \arctan\left(\frac{W}{2 \cdot h_f}\right) \tag{11}$$

$$a_c = \arctan\left(\frac{W}{2 \cdot h_c}\right) \tag{12}$$

Figure 14:
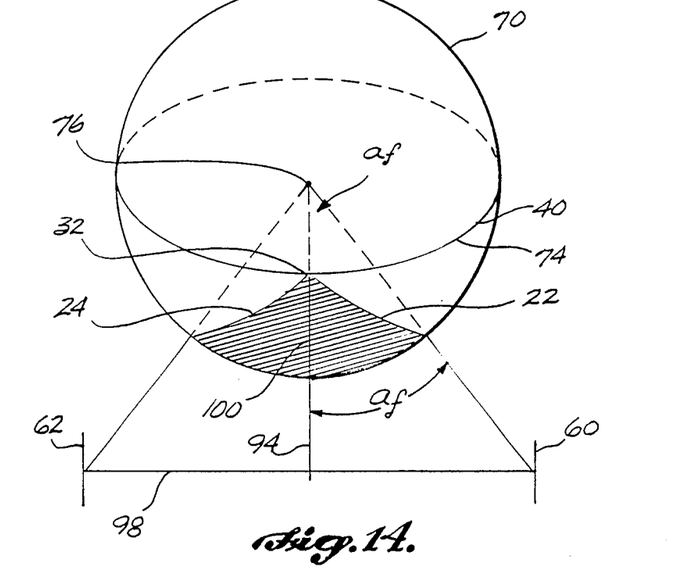
FIG. 14 shows the projection of a floor onto the sphere.

FIG. 14 shows the projection of lines 60 and 62 onto sphere 70, to form ceiling lines 22 and 24. Since the horizon is parallel to the floor (and to the ceiling), lines 22 and 24 each make an angle $a_f$ with line 100, line 100 being the projection of line 94 onto sphere 70. Since the orientation of ceiling 50 and floor 52 is determined by the velocity vector of the aircraft, the orientation of floor lines 60 and 62 and center point 32 are determined by the direction of travel, which is equal to −Y. Therefore the floor and ceiling lines can readily be obtained in a manner analogous to the production of horizon line 40. In particular, the longitude of the intersection of the floor and ceiling lines with the horizon line is determined based upon the yaw of the aircraft. The pitch of the horizon at longitude is then given by:

$$\psi' = \arctan(\sin(\lambda-\Omega)\cdot\tan\alpha) \tag{13}$$

Equation (13) being derived in a manner identical to the derivation of Equation (6). Using standard spherical trigonometric, identities, the roll of the artificial horizon at longitude λ is:

$$\rho' = \arcsin\left(\frac{\cos\alpha}{\cos\psi'}\right) \tag{14}$$

Figure 15:
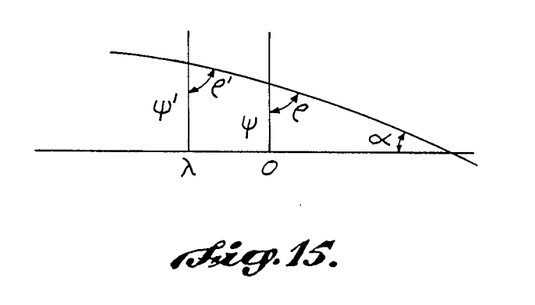
FIG. 15 shows the angular relationships for a floor or ceiling line with respect to the equator.

The parameters $\psi'$ and $\rho'$ are shown in FIG. 15. Thus, the roll of the right and left ceiling lines ($\rho_{rc}$ and $\rho_{lc}$) and the right and left floor lines ($\rho_{rf}$ and $\rho_{lf}$) may then be determined as follows:

$$\rho_{rc}=\rho'+\pi/2-a_c \tag{15}$$

$$\rho_{lc}=\rho'+\pi/2+a_c \tag{16}$$

$$\rho_{rf}=\rho'+3\pi/2+a_f \tag{17}$$

$$\rho_{lf}=\rho'+3\pi/2-a_f \tag{18}$$

Since each of the floor and ceiling lines is a great circle on sphere 70, each may then be determined in a manner fully analogous to the method illustrated above for horizon line 20, with the only change being that the angle $\Omega$ must be more carefully defined as follows:

$$\Omega=\lambda-\Delta \text{ for } \tan\rho \geq 0 \tag{19}$$

$$\Omega=\lambda+\Delta-\pi \text{ for } \tan\rho < 0 \tag{20}$$

Figure 16:
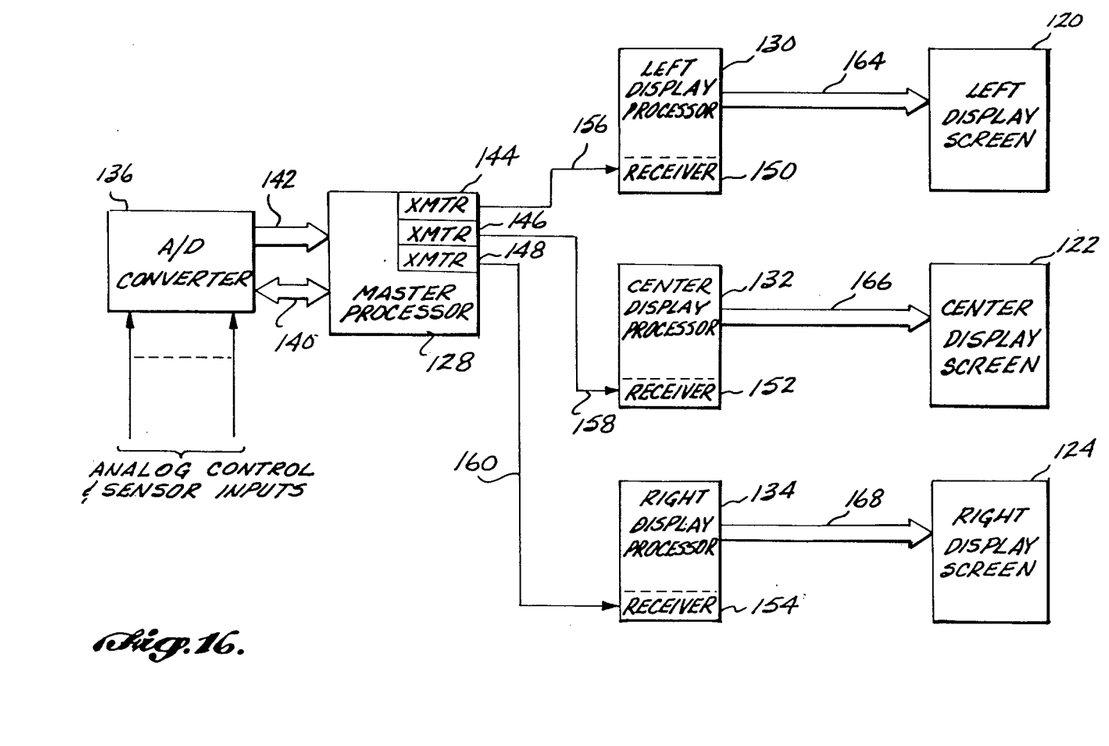
FIG. 16 is a block diagram of a preferred embodiment of the display system for multiple display screens.

A preferred system for implementing the panoramic display system of the present invention, and Equations (1)–(20) above, is illustrated in FIG. 16. In FIG. 16, it is assumed that panoramic display 12 comprises three flat panel display screens 120, 122, and 124. However, the system could readily be extended to an arbitrary number of flat panel display screens. Each display screen is associated with a range of longitudes of panoramic display 12, and displays those portions of the horizon, ceiling and floor lines that lie within its longitude range. The principal components of the display system of FIG. 16 include master processor 128, display processors 130, 132, and 134, and analog/digital (A/D) converter 136. The A/D converter communicates with master processor 128 via control bus 140 and data bus 142. The A/D converter receives input signals from the various aircraft sensors, and digitizes such signals in response to control signals from the master processor via bus 140. Alternatively, master processor 128 could interface directly to a serial bus from which the required sensor signals could be derived in digital form. In either case, the sensor signals include signals representing the roll, pitch, yaw and altitude of the aircraft. The update rate at which the master processor obtains such signals may be set equal to the refresh rate for display screens 120, 122 and 124. A suitable update/refresh rate is 60 Hz. Thus in the embodiment shown in FIG. 16, master processor 128 obtains new values for the aircraft roll, pitch, yaw and altitude from A/D converter 136 via bus 142.

Each time that master processor 128 receives new values for roll, pitch, yaw and altitude, the master processor calculates the parameters that characterize the horizon, ceiling and floor lines. In particular, with respect to horizon line 20, the master processor determines the quantity H(α) using Equations (1), (2) and (8), and the quantity Ω using Equations (3), (4) and (5). Analogous calculations are made for the ceiling lines 22 and 24 and floor lines 26 and 28. These parameters are then transmitted to each of the display processors via serial data links associated with each display processor. In particular, transmission to display processor 130 is accomplished via transmitter 144 in master processor 128, receiver 150 in display processor 130, and serial bus 156. In a similar manner, transmission of data to display processor 132 is via transmitter 146, receiver 152 and bus 158, and transmission of data to display processor 134 is via transmitter 148, receiver 154 and bus 160. Each display processor receives the parameters calculated by the master processor, and proceeds to generate the individual points of the horizon, ceiling and floor lines within the longitude range of its associated display screen, by means of Equation (10) for the horizon line and analogous equations for the ceiling and floor lines. The calculated points are then transmitted to display screens 120, 122 and 124 via buses 164, 166 and 168, respectively. Each display processor preferably includes a raster scan memory mapped to allow line at a time scan at a 60 Hz repetition rate to the corresponding display screen. In such a system, the display processor both reads and writes to random locations in the raster scan memory, memory access being multiplexed with raster scan memory access on a real-time basis. Alternatively, data may be transferred from the display processor memory to a bit map memory via dedicated DMA hardware. Such techniques are conventional in the art of video display systems. In both the master and display processors, processing time may advantageously be improved by the use of lookup tables for trigonometric functions.

While the preferred embodiments of the invention have been illustrated and described, it should be understood that variations will be apparent to those skilled in the art. For example, it has often been observed that flight deck windows impose a significant drag and weight penalties in the operation of modern commercial jet aircraft. Thus, one application of a panoramic display system could include the substitution of a television monitor for aircraft windows, and integration of the resulting television picture with the panoramic display described herein. Accordingly, the invention is not to be limited to the specfic embodiments illustrated and described, and the true scope and spirit of the invention are to be determined by reference to the following claims.

The embodiments of the invention in which an exclusive property or privilege is claimed are defined as follows:

1. A display system for use in an aircraft, the display system being adapted to receive signals representing the orientation of the aircraft and to produce a corresponding display, the display system comprising:
    a nonspherical display screen; and
    line generation means for generating a line image on the nonspherical display screen such that the position of the line image on the display screen corresponds to the position of a projection of a three-dimensional artifact external to the aircraft onto an imaginary window to an eye point within the aircraft, the eye point being positioned on the opposite side of the window from the artifact, wherein the line generation means includes means for determining the position of a great circle on a sphere having its center at the eye point such that the position of the great circle on the sphere corresponds to the artifact projected onto the sphere to the eye point, and means for generating the line image on the display screen such that the position of the line image on the nonspherical display screen corresponds to the position of the great circle on the sphere.

2. The display system of claim 1, wherein the means for determining the position of the great circle comprises means for determining the position of an intersection point between the great circle and an equator on the sphere, the equator being defined as the line of intersection between the sphere and a plane that passes through the eye point and that is horizontal with respect to the aircraft.

3. The display system of claim 2, wherein the means for determining the position of the great circle further comprises means for determining the spherical angle between the great circle and the equator at the intersection point.

4. The display system of claim 1, wherein the window is a segment of the surface of a cylinder having an axis oriented vertically with respect to the aircraft.

5. The display system of claim 4, wherein the axis of the cylinder passes through the eye point, and wherein the radius of the cylinder is equal to the distance between the eye point and the window.

6. The display system of claim 5, wherein the window includes a longitude direction normal to said axis of the cylinder, and a latitude direction parallel to said axis of the cylinder, the window having a greater angular extent in the longitude direction than in the latitude direction.

7. The display system of claim 6, wherein the line generation means includes means for determining the position of a great circle on a sphere having its center at the eye point such that the position of the great circle on the sphere corresponds to the artifact projected onto the sphere to the eye point, and means for generating the line image such that the position of the line image on the display screen corresponds to the position of the great circle on the sphere.

8. The display system of claim 7, wherein the line generation means further includes means for projecting the great circle from the sphere onto the cylinder in a direction away from the eye point to determine the position of the line image on the display screen.

9. The display system of claim 8, wherein the means for determining the position of the great circle comprises means for determining the position of an intersection point between the great circle and an equator on the sphere, the equator being defined as the line of intersection between the sphere and a plane that passes through the eye point and is horizontal with respect to the aircraft.

10. The display system of claim 9, wherein the means for determining the position of the great circle further comprises means for determining the spherical angle between the great circle and the equator at the intersection point.

11. The display system of claim 1, comprising a plurality of display screens positioned approximately adjacent to one another, such that each display screen can be viewed from a single viewing point, and wherein the line generation means includes means for generating a partial line image on each display screen such that the position of each partial line image on its associated display screen corresponds to the position of the projection of the artifact onto a window portion to the eye point, such that the eye point is common to all window portions and such that the spatial relationship of the window portions with respect to one another is congruent with the spatial relationship of the display screens with respect to one another.

12. The display system of claim 11, wherein each display screen is positioned such that a line normal to a portion of the display screen passes approximately through the eye point.

13. The display system of claim 12, wherein the window portions comprise laterally adjacent segments of the surface of a cylinder having an axis oriented vertically with respect to the aircraft.

14. The display system of claim 13, wherein the axis of the cylinder passes through the eye point, and wherein the radius of the cylinder is equal to the distance between the eye point and each window portion.

15. The display system of claim 14, wherein each window portion includes a longitude direction normal to said axis of the cylinder, and a latitude direction parallel to said axis of the cylinder, the window portions being aligned side-by-side with respect to one another along a common longitude direction.

16. The display system of claim 15, wherein the line generation means includes means for determining the position of a great circle on a sphere having its center at the eye point such that the position of the great circle on the sphere corresponds to the artifact projected onto the sphere to the eye point, and means for generating the partial line images such that the position of each partial line image on its associated display screen corresponds to the position of the great circle on the sphere.

17. The display system of claim 16, wherein the line generation means further includes means for projecting the great circle from the sphere onto the cylinder in a direction away from the eye point to determine the position of the partial line images on each display screen.

18. The display system of claim 17, wherein the means for determining the position of the great circle comprises means for determining the position of an intersection point between the great circle and an equator on the sphere, the equator being defined as the line of intersection between the sphere and a plane that passes through the eye point and is horizontal with respect to the aircraft.

19. The display system of claim 18, wherein the means for determining the position of the great circle further comprises means for determining the spherical angle between the great circle and the equator at the intersection point.

20. The display system of claim 19, wherein the line generation means comprises a master processor, a plurality of display processors, one display processor being associated with each display screen, and communication means for transmitting data from the master processor to the display processors, the master processor being operative to periodically determine the position of the intersection point and the spherical angle, and to periodically transmit data specifying the intersection point and spherical angle to each display processor, each display processor being operative to receive said data and to periodically generate the partial line image corresponding to the range of longitude positions associated with that display screen.

21. The display system of claim 1, 11, or 21, wherein the artifact comprises a straight line forward of the aircraft in a position approximately corresponding to the position of the actual horizon as viewed from the aircraft.

22. The display system of claims 1, 11, or 20, wherein the artifact comprises a pair of straight lines defining the lateral boundaries of a planar strip, the planar strip having a constant altitude and extending forwardly from the position of the aircraft.

23. The display system of claim 22, wherein the altitude of the planar strip can be any one of a discrete number of altitude values, and wherein the altitude values selected at a given time is the smallest altitude value having a latitude greater than the current altitude of the aircraft.

24. The display system of claim 23, where the artifact comprises a first pair of straight lines corresponding to the lateral edges of a first planar strip and a second pair of straight lines corresponding to the lateral edges of a second planar strip, the first and second planar strips being parallel to one another, each planar strip having a constant altitude and extending forwardly from the aircraft position away from the aircraft, wherein each planar strip can take on any one of a discrete number of altitude values, the altitude value of the first planar strip being the smallest of said discrete values greater than the current aircraft altitude, and the altitude value of the second planar strip being the largest of said discrete values less than the current aircraft altitude.

* * * * *

UNITED STATES PATENT AND TRADEMARK OFFICE
Certificate

Patent No. 4,740,779                                                                    Patented: April 26, 1988

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John A. Rupp, Swisher, Iowa; Patrick J. Cleary, Federal Way, WA; Arnold G. Gesell, Bellevue, WA; Warren P. Stewart, Kent, WA; and Craig A. Hopperstad, Seattle, WA.

Signed and Sealed this Seventh day of January 2003.

WU DANIEL
*Supervisory Patent Examiner*
Art Unit 2632